US012512582B2

(12) United States Patent
Kodama et al.

(10) Patent No.: US 12,512,582 B2
(45) Date of Patent: Dec. 30, 2025

(54) WIRELESS WEARABLE DEVICE

(71) Applicant: GOERTEK TECHNOLOGY CO., LTD., Shandong (CN)

(72) Inventors: Kenichiro Kodama, Shandong (CN); Katsunori Ishimiya, Shandong (CN)

(73) Assignee: GOERTEK TECHNOLOGY CO., LTD., Shandong (CN)

( * ) Notice: Subject to any disclaimer, the term of this patent is extended or adjusted under 35 U.S.C. 154(b) by 321 days.

(21) Appl. No.: 18/043,260

(22) PCT Filed: Sep. 7, 2020

(86) PCT No.: PCT/CN2020/113684

§ 371 (c)(1),
(2) Date: Feb. 27, 2023

(87) PCT Pub. No.: WO2022/047765

PCT Pub. Date: Mar. 10, 2022

(65) Prior Publication Data

US 2023/0327329 A1 Oct. 12, 2023

(51) Int. Cl.

*H01Q 1/27* (2006.01)
*H01Q 1/50* (2006.01)
*H04R 1/10* (2006.01)

(52) U.S. Cl.

CPC ............... *H01Q 1/273* (2013.01); *H01Q 1/50* (2013.01); *H04R 1/1016* (2013.01); *H04R 2201/10* (2013.01)

(58) Field of Classification Search

CPC H01Q 1/273; H01Q 1/50; H01Q 1/44; H01Q 9/42; H04R 1/1016; H04R 2201/10
See application file for complete search history.

(56) References Cited

U.S. PATENT DOCUMENTS

2013/0214979 A1 8/2013 McMilin et al.
2014/0055309 A1 2/2014 Jenwatanavet
2014/0253393 A1 9/2014 Nissinen et al.
(Continued)

FOREIGN PATENT DOCUMENTS

CN 101938541 A 1/2011
CN 104055499 A 9/2014
(Continued)

*Primary Examiner* — Minh Tran

(74) *Attorney, Agent, or Firm* — Ingrassia Fisher & Lorenz, LLP

(57) ABSTRACT

A wireless wearable device, including a housing, a PCB located inside the housing, and an antenna module connected to the PCB. The antenna module is configured to transmit and receive a wireless signal, and includes a first electrode, of which a portion is located at a surface of the housing. The portion of the first electrode keeps in contact with a skin of a user when the wireless wearable device is worn by the user. A total length of the first electrode can be lower a quarter of a wavelength applied in wireless communication. The user does not need to perform an intentional touch or grip due to a constant contact in wearing. A metal housing can be applied without screening transmitted and received signals. Miniaturization of the whole device is achieved while ensuring good quality of wireless communication.

17 Claims, 5 Drawing Sheets

(56) References Cited

U.S. PATENT DOCUMENTS

| | | | | |
|---|---|---|---|---|
| 2016/0183016 | A1* | 6/2016 | Sø | H01Q 1/273<br>381/315 |
| 2016/0218419 | A1* | 7/2016 | Vance | H01Q 1/241 |
| 2016/0262235 | A1 | 9/2016 | Clymer et al. | |
| 2020/0106170 | A1* | 4/2020 | Kerselaers | H04B 5/43 |

FOREIGN PATENT DOCUMENTS

| | | | |
|---|---|---|---|
| CN | 106207459 | A | 12/2016 |
| CN | 106848535 | A | 6/2017 |
| CN | 106921030 | A | 7/2017 |
| CN | 107205649 | A | 9/2017 |

* cited by examiner

WIRELESS WEARABLE DEVICE

CROSS-REFERENCE TO RELATED APPLICATION

This application is a U.S. National-Stage entry under 35 U.S.C. § 371 based on International Application No. PCT/CN2020/113684, filed Sep. 7, 2020 which was published under PCT Article 21(2), which is hereby incorporated herein in its entirety by reference.

TECHNICAL FIELD

This application pertains to the technical field of wireless communication, and in particular, to a wireless wearable device.

BACKGROUND

Recent decades have witnessed prosperity of wireless communication technology. An increasing requirement on convenient "anytime and anywhere" accesses to the Internet and WLANs leads to a rapid development of electronic devices that are wireless and portable, such as mobile phones, tablets and handheld game consoles. Miniaturization of wireless devices is a trend in both research and business, which aims at merging the wireless communication into each application scenario in people's daily life. A prospect is that the wireless devices are light, so as to provide high-quality wireless accesses without putting a significant burden on users. Such objective demands wireless devices that are increasingly compact, and thereby raises great challenges on downscaling integrated circuits, batteries, and antennas. In addition, other objects, desirable features and characteristics will become apparent from the subsequent summary and detailed description, and the appended claims, taken in conjunction with the accompanying drawings and this background.

SUMMARY

In one embodiment, the wireless wearable device includes a housing, a printed circuit board (PCB) located inside the housing, and an antenna module connected to the PCB. The antenna module is configured to transmit and receive a wireless signal. The antenna module includes a first electrode. At least a portion of the first electrode is located at a surface of the housing, and the portion of the first electrode keeps in contact with a skin of a user when the wireless wearable device is worn by the user.

In one embodiment, the antenna module is configured to transmit and receive the wireless signal under a same communication protocol when the wireless device communicates wirelessly with another device.

In one embodiment, the antenna module is configured to transmit and receive the wireless signal via a body of the user.

In one embodiment, a total length of the first electrode is less than a quarter of a wavelength corresponding to the communication protocol.

In one embodiment, the total length of the first electrode is equal to an eighth of the wavelength corresponding to the communication protocol.

In one embodiment, the communication protocol includes one or more of Bluetooth®, wireless fidelity, GPS, or Cellular.

In one embodiment, the wireless wearable device is a wireless earbud.

In one embodiment, the first electrode includes a feeding part and a flat part. The flat part is connected to an RF circuit of the PCB via the feeding part.

In one embodiment, the feeding part is connected to the RF circuit through soldering, flexible print circuits, conductive printing, metal-plate connection, or wiring.

In one embodiment, the feeding part includes a band or a wire extending from the RF circuit to the flat part.

In one embodiment, the flat part includes a plate with a shape and a thickness, and the shape of the flat part is rectangular, circular, or trapezoid.

In one embodiment, the total length of the first electrode is equal to a sum of a length of the feeding part, the thickness of the flat part, and a half of a peripheral of the shape of the flat part.

In one embodiment, the communication protocol includes one of the Bluetooth® or the wireless fidelity, and a total length of the first electrode ranges from 5 mm to 15 mm.

In one embodiment, the flat part is a rectangular metal sheet, and the feeding part is a metal band including a first part and a second part that are connected with each other. The first part is in a plane perpendicular to a width direction of the flat part and extends along a thickness direction of the plat part, and the second part is in a plane perpendicular to the thickness direction of the flat part and extends along the width direction of the flat part. The first part is connected to an edge of the flat part, and the second part is connected to the PCB.

In one embodiment, the first electrode contacts the skin of a tragus, an antitragus, an antihelix, or crus of helix of an ear of the user.

In one embodiment, the housing includes at least a first shell and a second shell, the second shell is pluggable into the ear of the user, and the portion of first electrode is located at a side surface of the inner shell.

In one embodiment, the housing is made of an insulating material, and the first electrode is embedded in the insulating material.

In one embodiment, the insulating material is an elastic material.

In one embodiment, the housing is made of a conductive material. The housing is connected to the first electrode, or the housing serves as the first electrode.

In one embodiment, the conductive material is a metal.

In one embodiment, the wireless wearable device further includes a second electrode. The PCB is configured to detect a change in capacitance between the housing and the second electrode to determine an operation performed by the user on the housing.

In one embodiment, the wireless wearable device further includes a battery located in the housing. The battery is charged via the first electrode, in a case that the wireless wearable device is not worn by the user.

In one embodiment, two terminals of the battery are connected to the first electrode and another electrode, respectively, when the battery being charged.

In one embodiment, the first electrode includes two separate pieces, and two terminals of the battery are connected to the two separate pieces, respectively, when the battery being charged.

In one embodiment, the first electrode is made of at least one of brass, copper, aluminum, stainless steel, or phosphor bronze.

In one embodiment, the first electrode is coated with a layer of gold or alumite at least in a region contacting the skin.

In one embodiment, the wireless wearable device is one of a virtual reality apparatus, an augmented reality apparatus, an electronic clothing, a necklace, a wristband, a ring, or glasses, which is capable to perform wireless communication.

The wireless wearable device is provided according to an embodiment of the present disclosure, including the housing, the PCB located inside the housing, and the antenna module connected to the PCB. The antenna module is configured to transmit and receive the wireless signal, and includes the first electrode, of which a portion is located at the surface of the housing. The portion of the first electrode keeps in contact with the skin of the user when the wireless wearable device is worn by the user. The antenna of the wireless wearable device is formed by the first electrode in conjunction with a part of the human body. Hence, a total length of the first electrode can be reduced to a level smaller than a quarter of a wavelength applied in wireless communication, leading to a smaller size of the whole device. The wireless wearable device does not need an intentional touch or grip performed by the user due to a constant contact in wearing. Thereby, a state of the antenna is stable, improving quality of the transmitted and received signals. Moreover, the first electrode is located at the surface of the housing, which allows the wireless wearable device to apply a metal housing without screening the transmitted and received signals.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

To make the object, technical solutions and advantages of the present application clearer, hereinafter technical solutions in some embodiments of the present disclosure are described in conjunction with the drawings in some embodiments of the present disclosure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

A size of an antenna is generally limited by a frequency band applied in a corresponding protocol of the wireless communication. More specifically, a length of a conventional antenna should be at least a quarter of a corresponding wavelength in order to achieve a good quality of transmitted or received signals. Even if popular wireless devices have already applied super-high-frequency (SHF) band in communication, e.g. Bluetooth® and Wi-fi, such limitation still greatly hinders miniaturization of conventional wireless wearable devices. In traditional very-high-frequency (VHF) band of radio waves, proposed was a concept that applying the human body as the antenna or as a part of the antenna, so as to reduce a size of a handheld radio receiver. Nevertheless, frequencies of the VHF band (~100 MHz) is quite lower than those of a common SHF band (~GHz), therefore a size of the antenna is much larger than that of the popular wireless devices by several orders of magnitude, and another problem lies in that the wireless signals of high frequencies is degraded more greatly by the human body. Moreover, the radio receiver requires an intentional grip in handholding. Since a gripping position may change due to various postures of a user or various habits of different users, the quality of transmitted or received signals is not stable.

Further, since a protruding antenna is apt to be damaged under an external force, the conventional wireless wearable devices generally encloses the antenna inside the housing. In such case, the housing can only be made of an insulating material to avoid electromagnetic shielding, which puts limits on fabrication and increases risks of electrostatic damages.

Figure 1:
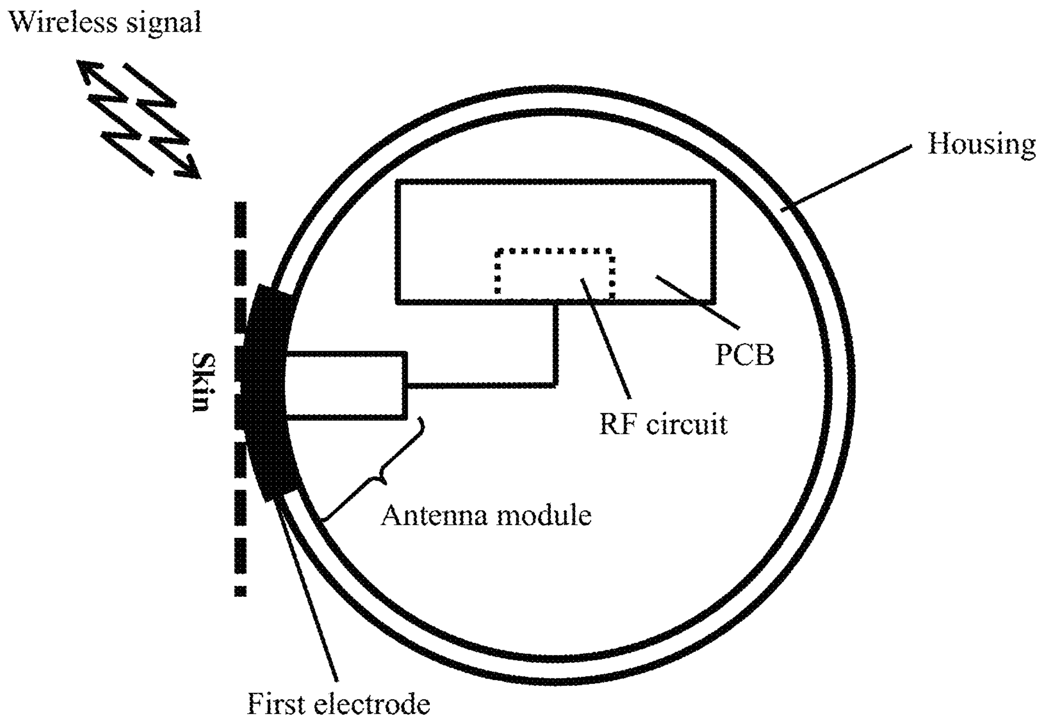
FIG. 1 is a schematic structural diagram of a wireless wearable device according to an embodiment of the present disclosure.

Reference is made to FIG. 1, which is a schematic structural diagram of a wireless wearable device according to an embodiment of the present disclosure. As shown in FIG. 1, a wireless wearable device includes a housing, a printed circuit board (PCB), and an antenna module. The PCB is located inside the housing. The antenna module is connected to the PCB, and is configured to transmit and receive a wireless signal. The antenna module includes a first electrode. At least a portion of the first electrode is located at a surface of the housing, and such portion keeps in contact with a skin of the user when the wireless wearable device is worn by the user.

The housing of the wireless wearable device may implement various functions. A main function is to provide protection over circuits, inner sensors or other elements that may be located inside. Another function may be providing an interface for the user to control the wireless wearable device. For example, a button or a touch sensor may be provided on the housing to implement starting, shutdown, standby, or other modes of the wireless wearable device, when the user touches or presses a corresponding region on the housing. It is appreciated that such function may be implemented alternatively via a mechanical switch, or even not provided in a case that the wearable device is controlled wirelessly or by an inner sensor (such as a capacitive sensor, a strain sensor, a gravity sensor, or a temperature sensor).

The PCB inside the housing is configured to receive, process, and transmit signals via a peripheral element connected to the PCB. The peripheral element may be configured to collect information inside or outside the wireless wearable device, or generate information under control of the PCB. For example, the peripheral element may include the antenna module, a sensor, a speaker, a motor, a microphone, a light emitting diode, a display, a battery, or the like. It is appreciated that a processor may be attached on the PCB to implement the relevant function.

The antenna module is configured to transmit and receive the wireless signal, so as to achieve wireless communication with one or more external devices. The external devices include, but are not limited to, a mobile phone, a laptop, a desktop, a tablet, a router, or a base station. An external device depends on an application environment in practice. It is appreciated that the wireless communication is based on a communication protocol, such as Bluetooth®, wireless fidelity (Wi-fi), global positioning system (GPS), or Cellular.

The first electrode of the antenna module when keeping contact with the skin would form an antenna in conjunction with the human body. In some embodiments of the present disclosure, the human body does not constitute the whole antenna, to avoid a high impedance on high-frequency signals. Instead, the human body act as a part of the antenna to compensate the first electrode with a reduced length. Thereby, a length of the first electrode located in the wireless wearable device can be significantly reduced, a size of the whole device is smaller, and wearing experience is improved.

Another advantage of the wireless wearable device according to embodiments of the present disclosure lies in that the first electrode always kept contact with the skin of the user during usage, that is, when the device is worn by the user. Accordingly, it is quite improbable that the quality of signal changes due to detachment of the device from the human body. Since a stable condition of the antenna is ensured, the quality of the wireless signals transmitted or received by the antenna module is guaranteed.

It should be noted that the human body may serve as a part of the antenna for one of the communication protocols, i.e. a first protocol, supported by the wireless wearable device. For the first protocol, the antenna module transmits and receives the wireless signal via the human body. For another protocol, i.e. a second protocol, supported by the wireless wearable device, the first electrode itself may constitute the antenna, and the antenna module may transmit and receive the wireless signal via the first electrode only. When communicating under the second protocol, the first electrode may not contact with the skin of the user. It is appreciated that a wavelength for the first protocol is usually greater than that for the second protocol, because a length of the antenna is shorter for the second protocol. For example, the wireless wearable device according to an embodiment of the present disclosure may apply Wi-fi of both 2.4 GHz and 5 GHz when worn by the user, and merely apply Wi-fi of 5 GHz when it is detached from the skin of the user. The switching between the first protocol and the second protocol may be controlled by a circuit on the PCB.

It should be noted that unless otherwise defined, hereinafter the term "antenna" refers to a combination of the first electrode and the human body, and the term "antenna module" refers to a peripheral element of the wireless wearable device that is connected to the PCB and includes the first electrode.

The wireless wearable device herein may be implemented as various daily gadgets or accessories. For example, the wireless wearable device may be an earbud, a necklace, a ring, a wristband, or glasses. It is noted that the wireless device herein is not limited to the aforementioned forms, as long as the associated gadget or accessory is capable to keep in contact with a skin of a user during usage. Namely, a part of the body skin always keeps in contact with a portion at a surface of the housing during usage. For example, a skin of an ear always keeps in contact with the housing around an earplug, in a case that the wireless wearable device is embodied as an earbud. Similarly, a skin of the neck always keeps in contact with the housing at a lower surface, in a case that the wireless wearable device is embodied as a necklace. A skin of a wrist always keeps in contact with the housing at an inner surface, in a case that the wireless wearable device is embodied as a wristband. A skin of a finger always keeps in contact with the housing at an inner surface, in a case that the wireless wearable device is embodied as a ring. A skin of two sides of the nose always keeps in contact with the housing at nodes pads, or a skin above the two ears always keeps in contact with the housing at temple tips, in a case that the wireless wearable device is embodied as glasses.

For clear and concise illustration, following description is mainly focused on embodiments of an earbud. It is appreciated that embodiments of other suitable gadgets or accessories may be acquired from the earbud through analogy. Therefore, features described in following embodiments may also apply to other suitable gadgets or accessories, even if details merely concern earbuds in the description.

Figure 2:
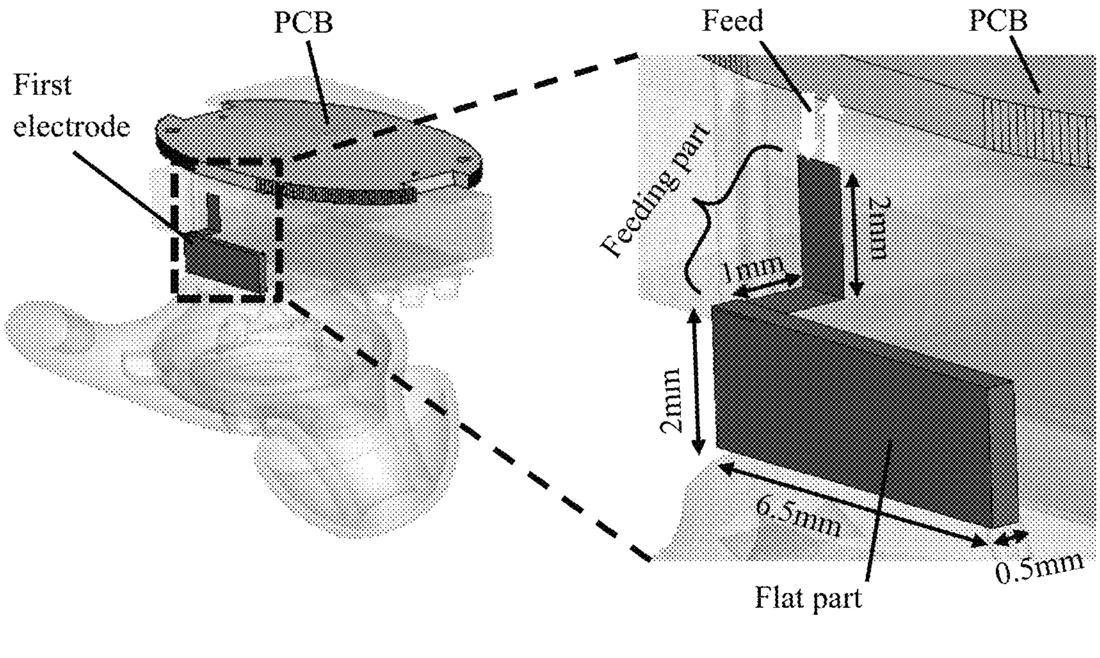
FIG. 2 is structural diagrams of an earbud according to an embodiment of the present disclosure.

Reference is made to FIG. 2, which is structural diagrams of an earbud according to an embodiment of the present disclosure. The left subfigure shows an overall three-dimensional view of the earbud, in which the PCB and the first electrode of the antenna module is emphasized by using deeper shades. It is noted that the housing is not completely shown in FIG. 2, for better illustrating a position of the PCB and the first electrode. Although FIG. 2 shows a specific physical configuration for the PCB and the first electrode, it is appreciated that the present disclosure is not limited thereto. The PCB and the first electrode may be implemented in other shapes and dimensions, as long as they can achieve transmission and receiving of signals in wireless communication.

In one embodiment, a total length of the first electrode is less than a quarter of a wavelength corresponding to the communication protocol. For example, the communication protocol may be Wi-fi of 2.4 GHz, of which a wavelength is 125 mm, and thereby the total length of the first electrode is less than $\frac{1}{4}\times125=31.25$ mm. For another example, the communication may be GPS of 1.228 GHz, of which a wavelength is 244.3 mm, and thereby the total length of the first electrode is less than $\frac{1}{4}\times244.3=61.075$ mm. Those skilled in the art can appreciate that a length required for an antenna corresponding to a wavelength should be at least a quarter of the wavelength in conventional technology. In this embodiment, a difference between such limitation and the total length of the first electrode is compensated by a part of the human body (namely, an ear for the earbud) contacting the first electrode. The first electrode is mainly configured to ensure a good quality of the signals when coupling the signals into the RF circuit of the PCB.

Moreover, it is appreciated that in a case that the housing is made of a conductive material such as metal, the housing may further serves as a part of the antenna besides the first electrode and the human body. In such case, a total length of the first electrode may be further reduced to a smaller scale.

In one embodiment, the total length of the first electrode is equal to an eighth of the wavelength corresponding to the communication protocol. For example, the communication protocol may be Wi-fi of 2.4 GHz, of which a wavelength is 125 mm, and thereby the total length of the first electrode is equal to ⅛×125=15.625 mm. For another example, the communication may be GPS of 1.228 GHz, of which a wavelength is 244.3 mm, and thereby the total length of the first electrode is equal to ⅛×244.3=30.5375 mm. Generally, the eighth of the wavelength is approximately a balance point between a quality of signals and a size of the first electrode. It is appreciated that in embodiments of the present disclosure, the total length of the first electrode may not be accurately equal to the eighth of the wavelength, and any value less than the quarter of the wavelength may be appropriate as long as the quality of signals and the size of the first electrode meet an application requirement.

Reference is further made to FIG. 2, where signals are fed from the RF circuit (not shown) of the PCB to the first electrode for transmission, or fed from the first electrode to the PCB for receiving. The first electrode is generally made of metal or other conductive materials, such as brass, copper, aluminum, stainless steel, or phosphor bronze. In one embodiment, the first electrode includes a feeding part and a flat part. The feeding part serves a bridge between the flat part and the PCB both signally and physically. That is, the flat part is connected and coupled to the PCB via the feeding part.

The feeding part is directly connected and coupled to the RF circuit of the PCB. As shown in FIG. 2, the feeding part may be a metal band includes two segments that are perpendicular to each other. It is noted that the feeding part may be implemented in other forms according to a specific structure of the wireless wearable device. For example, the feeding part may be an integral metal band or a metal plate. In one embodiment, the feeding part is connected to the RF circuit through conventional techniques, such as FPC (flexible print circuits), conductive printing (e.g. laser direct structuring), metal-plate connection, or wiring. The present disclosure is not limited thereto, as long as the formed feeding part can transmit signals well between the flat part and the RF circuit.

The flat part is directly in contact with the skin of the user. Generally, the flat part is a main component of the first electrode. The flat part may be a metal plate with a certain thickness. As shown in FIG. 2, the flat part may be a rectangular plate which is perpendicular to a connected segment of the feeding part. In one embodiment, such connected segment may be implemented as a contact spring or a pogo-pin. It is noted that the flat part may be implemented in other forms according to a specific structure of the wireless wearable device. For example, a shape of the flat part in a plane perpendicular to the thickness may be circular or trapezoid. In one embodiment, the shape may be a loop or a spiral according to a practical requirement. In another embodiment, the flat part may be curved to accommodate with a limited space within the housing.

The total length of the first electrode is determined by dimensions of the first electrode, and more specifically, by dimensions along which electromagnetic waves propagate in the first electrode. In one embodiment, the feeding part includes a band or a wire extending from the RF circuit to the flat part, and the flat part includes a plate with a certain shape and a certain thickness. In such case, the total length of the first electrode is equal to a sum of a length of the feeding part, a thickness of the flat part, and a half of a peripheral of the shape of the flat part. As an example, dimensions of the first electrode are marked in FIG. 2 according to an embodiment of the present disclosure. The first electrode is for wireless communication under one or both of the Bluetooth® and Wi-fi, of which a frequency is around 2.44 GHz and a wavelength is approximately 123 mm. The two segments of the feeding part are 2 mm and 1 mm, respectively, in length. The feeding part is 0.5 mm in thickness, 2 mm in width, and 6.5 mm in length. Hence, the length of the feeding part is equal to 2+1=3 mm, a half of the peripheral of the rectangular is equal to 6.5+2=8.5 mm, and the total length of the first electrode is equal to 3+0.5+8.5=12 mm, which is less than an eighth of the wavelength. It is appreciated that such dimensions are merely one embodiment of the present disclosure, and the dimensions and the shape concerning the first electrode can be tuned according to a practical requirement. For example, the total length of the first electrode may be controlled between 5 mm to 15 mm for the same wavelength, so as to implement the antenna in conjunction with the human body.

Figure 3:
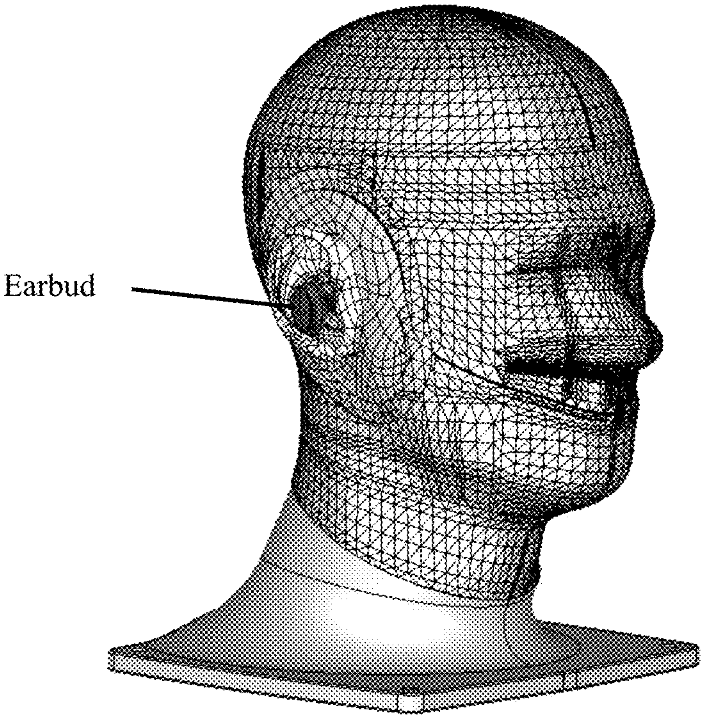
FIG. 3 is a diagram of a three-dimensional model of an earbud when worn by a user according to an embodiment of the present disclosure.

Hereinafter described are some details of performances of an earbud on a basis of FIG. 2. Reference is first made to FIG. 3, which is a diagram of a three-dimensional model of a user wearing an earbud according to an embodiment of the present disclosure. It is assumed that the earbud is worn on a right ear of a user. An earbud on a left ear can be easily deduce from such case. An overall human head is simulated to evaluate performances of the earbud.

Figure 4:
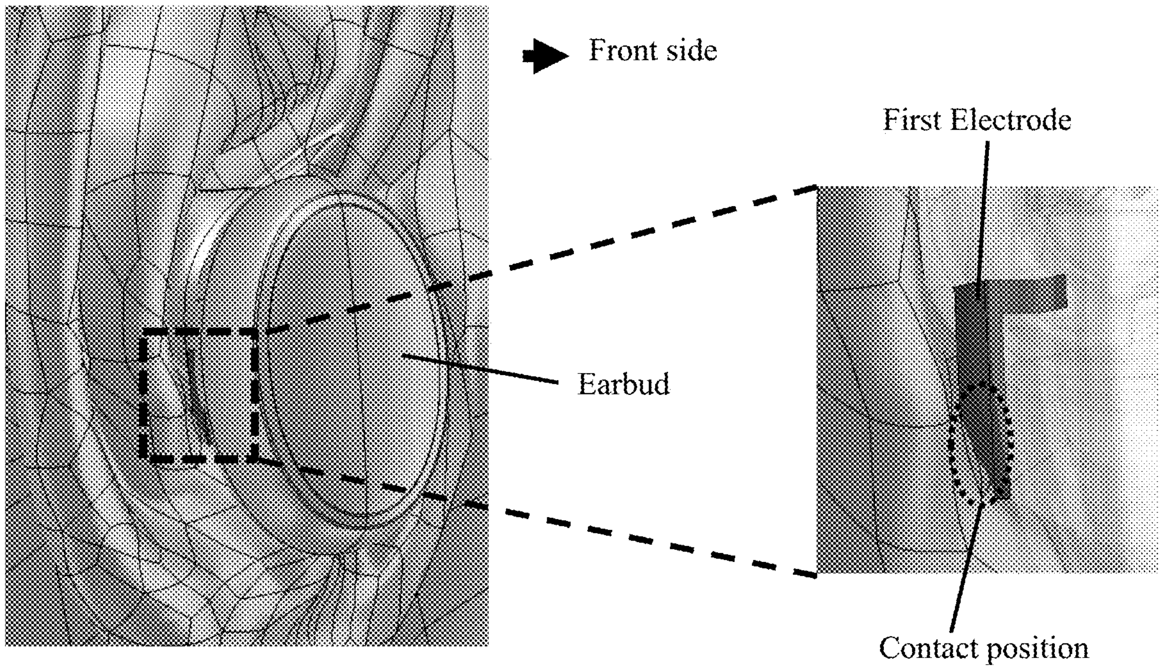
FIG. 4 is another diagram of a three-dimensional model of an earbud when worn by a user according to an embodiment of the present disclosure.

Reference is then made to FIG. 4, which is detailed diagrams of an earbud worn by a user according to an embodiment of the present disclosure. As shown in FIG. 4, the housing of the earbud includes a cylinder-like structure containing the PCB, which is located on an outer side of an earplug. A part of the first electrode is located at a position where a side surface of the cylinder structure contacts with the external ear. For better illustration, the portion in which the first electrode is located is enlarged. In the enlarged view, it can be seen that the flat part of the first electrode is in contact with the antitragus of the right ear, as indicated by a dotted circle. Thereby, at least the first electrode and the right ear would form an antenna for the earbud.

It is noted that FIG. 4 merely shows one embodiment of the present disclosure. In another embodiment, the housing of the earbud may be of an irregular shape that fits the concha of the human ears. Further, the first electrode may contact with the concha at another position, as long as the first electrode would keep contract with the concha during usage. An earbud with a small size when worn by a user is generally fixed to the ear through the earplug, or through a support wing fixed on a cylinder portion containing a speaker. Thereby, it may be more preferable that one or more positions near the entrance of the external acoustic meatus serve as a contact position. In one embodiment, the first electrode may keep in contact with at least one of a tragus, an antitragus, an antihelix, and crus of helix of an ear of the user, when the earbud is worn by the user.

Figure 5A:
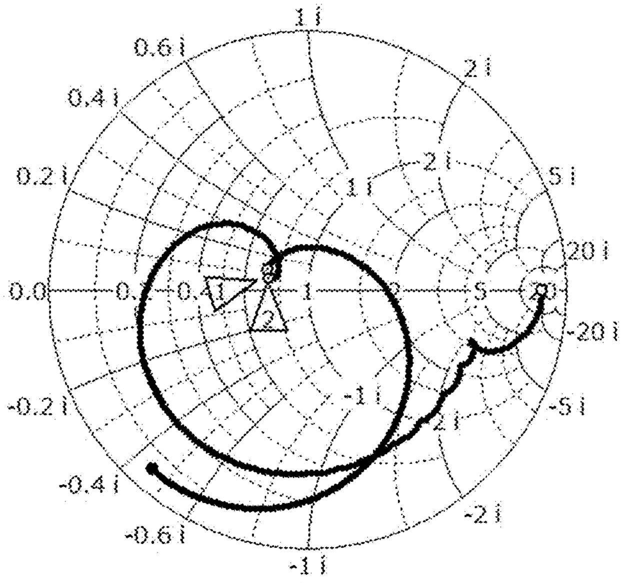
FIGS. 5*a* and 5*b* are Smith chart and a graph of a return loss of an antenna of an earbud according to an embodiment of the present disclosure.
Figure 5B:
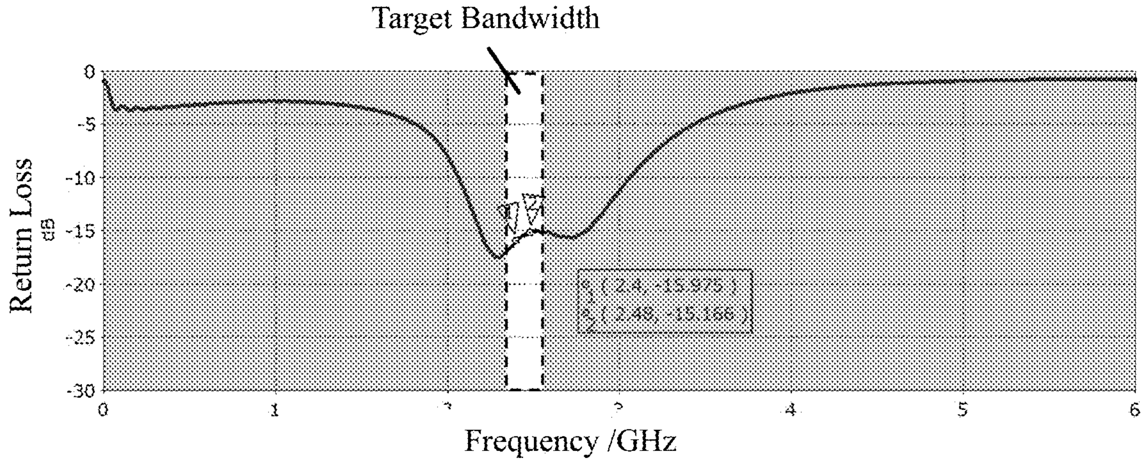

Reference is further made to FIGS. 5*a* and 5*b*, which are Smith chart and a graph of a return loss of an antenna of an earbud according to an embodiment of the present disclosure. Both the Smith chart and the graph of the return loss is obtained on a basis of the structure as shown in FIG. 2 and the model established as shown in FIG. 3. As an example, the target bandwidth in FIG. 5*b* corresponds to wireless communication under protocols of the Bluetooth® or 2.4 GHz Wi-fi. A matched impedance for the antenna is set to be 50 ohm.

As shown in FIGS. 5*a* and 5*b*, two frequencies within the target bandwidth are particularly marked, namely, point 1 representing a frequency of 2.4 GHz and point 2 representing a frequency of 2.48 GHz. From FIG. 5*a*, impedance of point 1 and point 2 can be obtained, which are (36.71+3.68i) ohm and (36.15+5.92i) ohm, respectively. Both points 1 and 2 are located near the center of the Smith chart, indicating a rather low reflection coefficient. As shown in FIG. 5*b*, the return losses of points 1 and 2 are −15.98 dB and −15.17 dB, respectively, and the curve within the target band is smooth. Therefore, the earbud with the first electrode as shown in FIGS. 2 and 3 provides signals with high quality between the PCB and the antenna for the target bandwidth.

Figure 6:
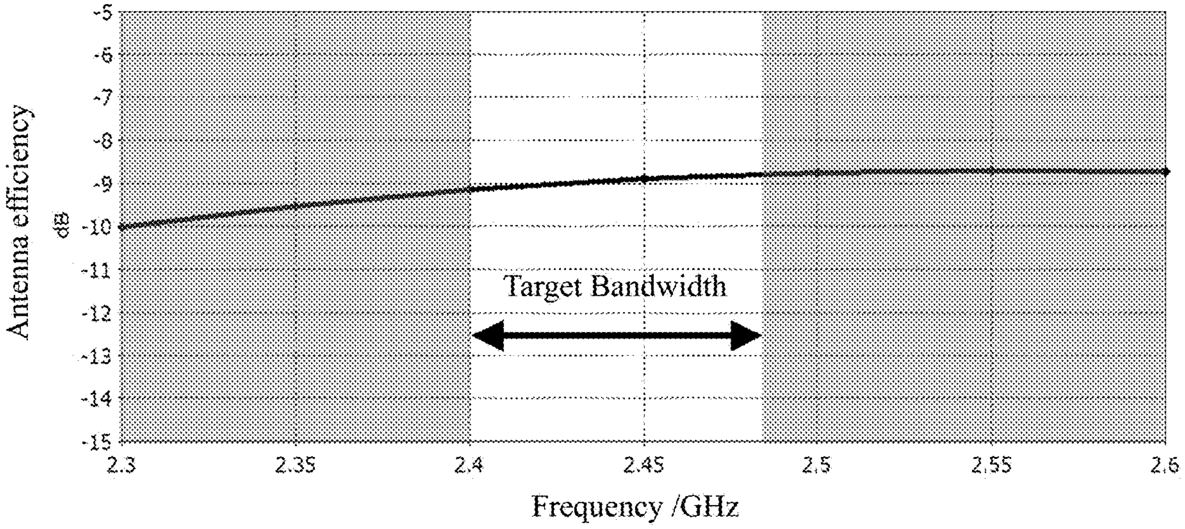
FIG. 6 is a graph of an antenna efficiency of an antenna of an earbud according to an embodiment of the present disclosure.

Reference is further made to FIG. 6, which is a graph of an antenna efficiency of an antenna of an earbud according to an embodiment of the present disclosure. The graph of the antenna loss is obtained on a basis of the structure as shown in FIG. 2 and the model established as shown in FIG. 3. FIG. 6 shows that the antenna efficiency is approximately −9 dB within the target bandwidth, and a profile of the curve in the target bandwidth is quite smooth. The antenna efficiency herein is defined as a ratio of the power delivered to the antenna relative to the power radiated from the antenna. Such result indicates that the first electrode contacting the human body does exhibit radiation characteristics of a standard antenna, and a very high portion of power present at an input of the antenna is radiated away from the human body for all signals within the target bandwidth. It is appreciated that such result further indicates a good performance of low power consumption. Thereby, a size of a battery required in the earbud can be reduced, which further contributes to the miniaturization of the whole device.

Figure 7A:
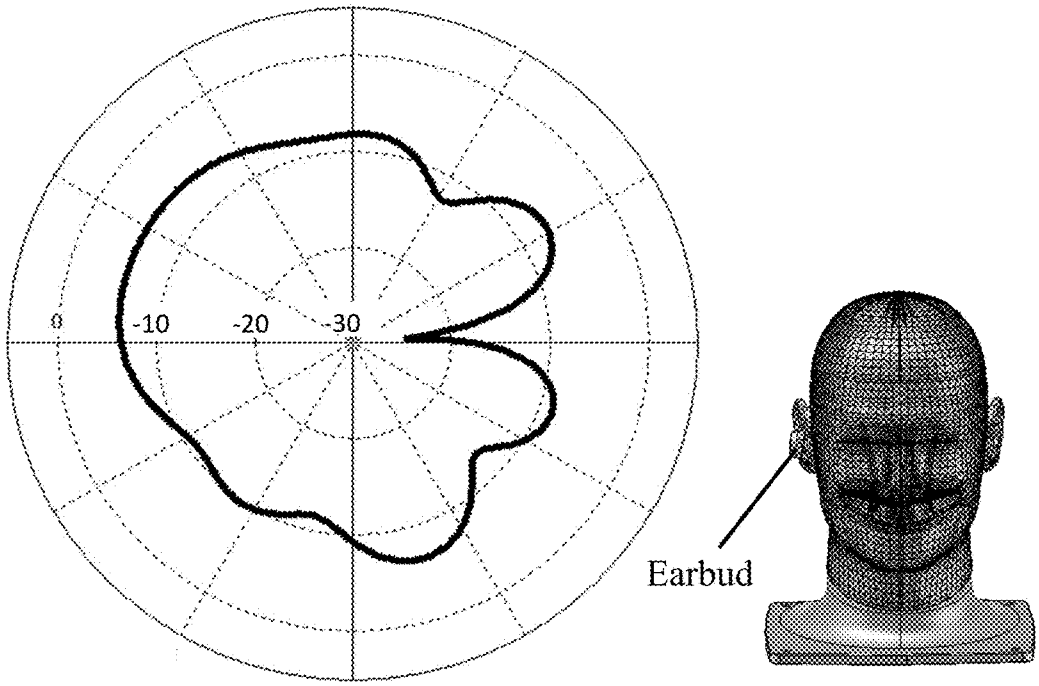
FIGS. 7*a* and 7*b* are graphs of radiation patterns of an antenna of an earbud according to an embodiment of the present disclosure.
Figure 7B:
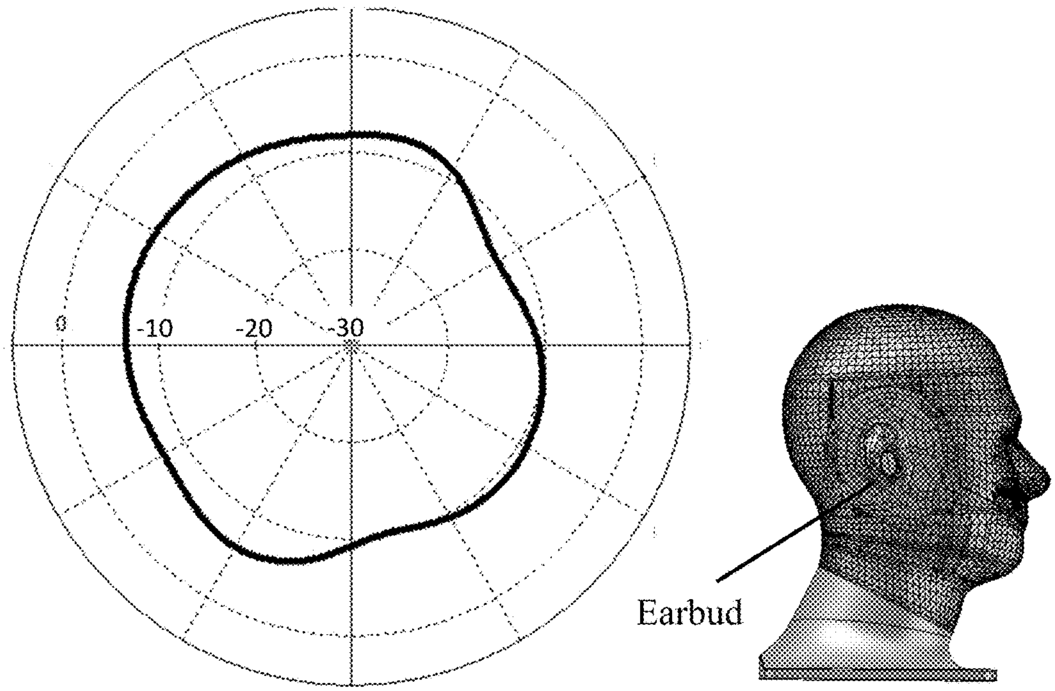

Reference is further made to FIGS. 7*a* and 7*b*, which are graphs of radiation patterns of an antenna of an earbud according to an embodiment of the present disclosure. The radiation patterns in FIGS. 7*a* and 7*b* are both depicted for vertical planes, where FIG. 7*a* concerns a plane parallel to a line connecting the two ears, and FIG. 7*b* concerns a plane perpendicular to the line connecting the two ears. A general radiation pattern for a whole sphere may be coarsely deduced from FIGS. 7*a* and 7*b*. It can be seen from FIGS. 7*a* and 7*b* that the radiation is nearly uniform in all directions, except for a direction pointing to the head. The reason lies in that there are various tissues and organs (even bones) along such direction besides the skin and the cartilage, thereby hindering propagation of electromagnetic signals. It is appreciated that such direction would not significantly influence the performances of the earbud. In practice, the signals in such direction may be collected by a paired earbud worn on the other ear, if necessary.

The above description concerning FIGS. 3 to 7*b* are related to performances of the earbud. Since a main principle of the first electrode contacting the skin of the human body is identical, similar technical effects are capable to be obtained in a case that the wireless wearable device is embodied in a form other than the earbud.

The wireless wearable device according to an embodiment of the present disclosure is further advantageous in selection of housing materials. Generally, a conventional wireless wearable device encloses an antenna within the housing to avoid damages due to an external force. Even though a design of metal housing is increasing popular in the consumer electronics, the housing enclosing the antenna could not be made of metal, in order to prevent the electromagnetic shielding effect from degrading the wireless signals. On the contrary, that would not be a limitation for the wireless wearable device according to an embodiment of the present disclosure. Since the antenna is constituted by at least the first electrode and the human body, the whole antenna is not enclosed by the housing. Hence, a metal housing would not shield a signal transmitted or received by the RF circuit of the inner PCB. Further, the first electrode is still well protected from possible bending or striking, because it is in contact with the skin of the user and therefore is not directly exposed to an external force.

In one embodiment, the housing is made of metal, and housing is connected to the first electrode or serves as the first electrode. The first electrode may be fabricated separately from the housing, even if both are made of metal. In such case, the first electrode and the housing may be made of different materials. The connection between the first electrode and the housing may be implemented through wiring (for example, the feeding part is connected to the housing via an inner wire), or simply through physical contact (for example, the flat part directly contacts the housing). Alternatively, the housing and the first electrode may be fabricated simultaneously or integrated with a same material. The housing itself may be a metal both contacting the skin of the user and coupled to the RF circuit of the inner PCB. In such case, the housing serves as the first electrode.

It is appreciated that the first electrode and the metal housing may not be connected to each other in some embodiments. In such case, an insulating material or a dielectric material may be provided around the first electrode for isolation from the housing.

In one embodiment, the metal housing may serve as a control means of the wireless wearable device. As an example, a second electrode is provided within the metal housing. A capacitance between the second electrode and the housing may be detected by, for example, a circuit on the PCB. The user may perform an operation such as a touch or a tap on the housing in a region corresponding to the second electrode. In such case, the detected capacitance would change, and thereby the operation of the user can be detected.

It is appreciated that the metal is not the only choice for fabricating the housing. The candidates may include other conductive materials, and even insulating materials. The metal material of the housing in the aforementioned embodiments may be replaced with another conductive material where appropriate. An advantage of using the metal or other conductive materials would reduce a risk of electrostatic damages, but the insulating materials are also feasible when applying a conventional electrostatic protection technique. Moreover, the housing can be made by using a combination of one or more of the above materials.

In one embodiment, the housing is made of an insulating material, and the first electrode is embedded in the insulating material. The embedding may be implemented by exposing a part of the first electrode via a window at the surface of the housing, or fixedly attaching the first electrode to the surface of the housing. The present disclosure is not limited thereto, as long as the first electrode is kept in contact with the skin during usage.

In one embodiment, the insulating material may be an elastic material, especially in a region of the housing near the first electrode. The elastic material may fit better to a shape of the skin of the human body, since such shape may vary for different users or different postures. Thereby, a better contact between the first electrode and the human body can be achieved.

A function of the first electrode may further be expanded according to an embodiment of the present disclosure. In one embodiment, the wireless wearable device further includes a battery located in the housing, and the battery is charged via the first electrode in a case that the wireless wearable device is not worn by the user. For example, a charger for the wireless wearable device includes a charging contact, and the first electrode is disposed in contact with the charging contact when the wireless wearable device is not worn by the user.

In practice, the PCB may include a circuit to detect a state of contact between the first electrode and the skin of the user. For example, an electric length of the antenna is reduced when the first electrode is detached from the skin, because it merely includes the first electrode. Thereby, amplitude of signals within a previous wireless band would be significantly reduced after the detachment. Accordingly, the detachment can be detected through the amplitude of signals. It is appreciated that another parameter is similarly applicable in such detection, as long as it may change due to the detachment. For example, a temperature, a resistance, or a capacitance concerning the first electrode may be applied. Once the detachment is detected, the circuit on the PCB may switch the first electrode from an "antenna mode" to a "charging mode", and an electrical connection between the first electrode and the battery may be activated, so that the first electrode is configured to charge the battery in such case.

The aforementioned mode switching may be implemented in a manner other than detachment detection. For example, the charging mode may be activated when detecting the wireless device is connected to a charging cable, is placed into a charging box, or is put near a wireless charging apparatus. Such detection may be implemented through conventional technologies, such as magnetic induction, which are not described in detail herein. It is noted that these manners of mode switching are suitable for the aforementioned case concerning the first protocol and the second protocol, where the detachment is configured as a condition for switching a wireless band applied in communication between the wireless wearable device and an external device.

The first electrode may conform with the charging function in various manners. In one embodiment, the first electrode may include two separate pieces. In the antenna mode, the two pieces may be connected with each other, and/or both connected to the RF circuit. In the charging mode, the two pieces may be disconnected from each other, and connected to positive and negative terminals, respectively, of the battery. As an alternative solution, the first electrode may include one piece. In the charging mode, the piece is connected to one of the positive or negative terminal of the battery, and the other terminal of battery is charged via an electrode different from the first electrode.

Some solutions may be further adopted to improve protection the first electrode. Since the first electrode directly contact with the skin in the wireless wearable device according to an embodiment of the present disclosure, it may be subject to secretion of the skin during usage, such as sweat. Anti-erosion means in conventional technology may be applied to the first electrode, or further to the metal housing. In one embodiment, the first electrode may be coated with a layer of gold or alumite at least in a region contacting the skin. It is appreciated that the coating may cover the whole first electrode, depending on a practical requirement.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A wireless wearable device, comprising:

a housing;

a printed circuit board, PCB, located inside the housing; and an antenna module connected to the PCB, wherein the antenna module is configured to transmit and receive a wireless signal;

wherein the antenna module comprises a first electrode, at least a portion of the first electrode is located at a surface of the housing, and the portion of the first electrode keeps in contact with a skin of a user when the wireless wearable device is worn by the user, the first electrode comprises a feeding part and a flat part, and the flat part is connected to an RF circuit of the PCB via the feeding part, the feeding part comprises a band or a wire extending from the RF circuit to the flat part, wherein the flat part is a rectangular metal sheet, and the feeding part is a metal band comprising a first part and a second part that are connected with each other, the first part is in a plane perpendicular to a width direction of the flat part and extends along a thickness direction of the flat part, and the second part is in a plane perpendicular to the thickness direction of the flat part and extends along the width direction of the flat part, the first part is connected to an edge of the flat part, and the second part is connected to the PCB.

2. The wireless wearable device according to claim 1, wherein the antenna module is configured to transmit and receive the wireless signal under a same communication protocol when the wireless device communicates wirelessly with another device.

3. The wireless wearable device according to claim 1, wherein the antenna module is configured to transmit and receive the wireless signal via a body of the user.

4. The wireless wearable device according to claim 1, wherein a total length of the first electrode is less than a quarter of a wavelength corresponding to the communication protocol, or the total length of the first electrode is equal to an eighth of the wavelength corresponding to the communication protocol.

5. The wireless wearable device according to claim 1, wherein the feeding part is connected to the RF circuit through soldering, flexible print circuits, conductive printing, metal-plate connection, or wiring.

6. The wireless wearable device according to claim 1, wherein the flat part comprises a plate with a shape and a thickness, and the shape of the flat part is rectangular, circular, or trapezoid.

7. The wireless wearable device according to claim 1, wherein:

the total length of the first electrode is equal to a sum of a length of the feeding part, the thickness of the flat part, and a half of a peripheral of the shape of the flat part.

8. The wireless wearable device according to claim 7, wherein in a case that the communication protocol comprises one of the Bluetooth® or the wireless fidelity, a total length of the first electrode ranges from 5 mm to 15 mm.

9. The wireless wearable device according to claim 1, wherein the wireless wearable device is a wireless earbud, the first electrode contacts the skin of a tragus, an antitragus, an antihelix, or crus of helix of an ear of the user.

10. The wireless wearable device according to claim 1, wherein the housing comprises at least a first shell and a second shell, the second shell is pluggable into the ear of the user, and the portion of first electrode is located at a side surface of the inner shell.

11. The wireless wearable device according to claim 1, wherein the housing is made of an insulating material, and the first electrode is embedded in the insulating material.

12. The wireless wearable device according to claim 1, wherein:

the housing is made of a conductive material; and the housing is connected to the first electrode, or the housing serves as the first electrode.

13. The wireless wearable device according to claim 12, further comprising a second electrode, wherein the PCB is configured to detect a change in capacitance between the housing and the second electrode to determine an operation performed by the user on the housing.

14. The wireless wearable device according to claim 1, further comprising a battery located in the housing, wherein the battery is charged via the first electrode in a case that the wireless wearable device is not worn by the user.

15. The wireless wearable device according to claim 14, wherein two terminals of the battery are connected to the first electrode and another electrode, respectively, when the battery being charged.

16. The wireless wearable device according to claim 14, wherein the first electrode comprises two separate pieces, and two terminals of the battery are connected to the two separate pieces, respectively, when the battery being charged.

17. The wireless wearable device according to claim 1, wherein the wireless wearable device is one of a virtual reality apparatus, an augmented reality apparatus, an electronic clothing, a necklace, a wristband, a ring, or glasses, which is capable to perform wireless communication.

* * * * *